US009560155B2

(12) United States Patent
Burckart et al.

(10) Patent No.: US 9,560,155 B2
(45) Date of Patent: Jan. 31, 2017

(54) ENSURING CONTENT FILTERING THROUGH A SPECIALIZED TIER OF PROXY CACHES AT THE BASE STATION

(75) Inventors: Erik J Burckart, Raleigh, NC (US); Gennaro A Cuomo, Cary, NC (US); Victor S Moore, Lake City, FL (US); Savio Rodrigues, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1296 days.

(21) Appl. No.: 12/910,359

(22) Filed: Oct. 22, 2010

(65) Prior Publication Data

US 2012/0099523 A1    Apr. 26, 2012

(51) Int. Cl.
*H04L 29/08* (2006.01)
(52) U.S. Cl.
CPC ....... *H04L 67/2819* (2013.01); *H04L 67/2842* (2013.01)
(58) Field of Classification Search
USPC . 370/328, 331; 709/219, 231, 203; 455/411, 418
See application file for complete search history.

(56) References Cited

U.S. PATENT DOCUMENTS

| 6,351,767 B1 | 2/2002 | Batchelder et al. | |
| 2006/0117139 A1* | 6/2006 | Kobayashi et al. | 711/118 |
| 2010/0008290 A1 | 1/2010 | Fischer et al. | |
| 2010/0177680 A1 | 7/2010 | Fischer et al. | |
| 2011/0153722 A1* | 6/2011 | Choudhary et al. | 709/203 |
| 2011/0202634 A1* | 8/2011 | Kovvali et al. | 709/219 |
| 2011/0280216 A1* | 11/2011 | Li et al. | 370/331 |
| 2011/0283011 A1* | 11/2011 | Li et al. | 709/231 |
| 2012/0122424 A1* | 5/2012 | Herscovici et al. | 455/411 |
| 2012/0184258 A1* | 7/2012 | Kovvali et al. | 455/418 |

FOREIGN PATENT DOCUMENTS

CN    1387643    12/2002

OTHER PUBLICATIONS

Header Field Definitions, www.w3.org, Mar. 11, 2014.

* cited by examiner

*Primary Examiner* — Albert T Chou
(74) *Attorney, Agent, or Firm* — Steven M. Greenberg, Esq.; CRGO Law

(57) ABSTRACT

Embodiments of the invention provide a method, system and computer program product for content caching with remote filtering services in a radio access network (RAN). In an embodiment of the invention, a method for content caching with remote filtering services in a RAN can include receiving a response to a request from an end user device wirelessly coupled to a base station of the RAN, marking the response as uncacheable, and routing the response to the base station over a data communications network. In one aspect of the embodiment, the response can be received in an RNC of the RAN. Of note, the process of marking the response as uncacheable can depend upon the evaluation of a policy with respect to the response. Finally, in another aspect of the embodiment, marking the response as uncacheable, can include annotating a hypertext transfer protocol (HTTP) header of the response to indicate that the response is not to be cached in the base station.

8 Claims, 2 Drawing Sheets

ENSURING CONTENT FILTERING THROUGH A SPECIALIZED TIER OF PROXY CACHES AT THE BASE STATION

BACKGROUND OF THE INVENTION

1. Field of the Invention

The present invention relates to content retrieval services provided in a radio access network and more particularly to the caching of retrieved content in a radio access network.

2. Description of the Related Art

The radio access network (RAN) provides for the foundation of modern cellular telephony. The RAN functions to join different end user mobile devices to a core network (CN) such that individuals can enjoy telephonic and data communications wirelessly within a geographic area covered by the various base stations of the radio access network. Generally speaking, the RAN provides the requisite infrastructure to pass both voice and data traffic from the over-the-air medium to both the terrestrial circuit switched communication network and the packet switched data communications network inclusive of the global Internet.

At present, several standards have been implemented in connection with the RAN. Examples include the global system for mobile communications (GSM), the universal mobile telecommunications system (UMTS) and the GSM "Edge" RAN (GERAN). The RAN generally includes multiple different radio network controllers (RNC) each managing a set of base stations providing wireless connectivity to a geographic cell. The entirety of the different RNCs of the RAN are linked to what is known as the cellular data core or CN through a gateway known as the serving generalized radio packet service node (SGSN). The CN provides various services to customers who are connected by the RAN. One of the main functions is to route calls across the public switched telephone network (PSTN). Another is to route data packets onto an Internet protocol (IP) network such as the global Internet so that end users of the RAN can access services provided by a content delivery network (CDN). To that end, the CN includes a gateway known as the gateway GPRS service node (GGSN).

The typical CDN can provide for advanced content delivery services such as content caching and content filtering. Content caching refers to the intermediate temporary storage of previously retrieved content under the assumption that a temporally proximate subsequent request for the content can be satisfied from temporary storage rather than repeating a more time consuming request for content in the CDN. In contrast, content filtering refers to the restriction of the delivery of requested content when the content meets a particular profile such as being published by a particular source or incorporating particular subject matter. In both instances, the packet processing requisite to performing advanced content services often demand that those services are provided within the CN where the communications protocol utilized in the CN is consistent with that of the global Internet—namely the transport control protocol (TCP) over IP.

Even still, some have suggested placing support for content services such as content caching and content filtering within the RAN. In this regard, United States Patent Application Publication No. 20100034089 by Kovvali et al. suggests the placement of content caching services within the RAN and the extraction of TCP/IP payloads from the RAN protocol specific to the RAN. Notwithstanding, placing content services like caching and filtering even closer to the end user within the various base stations is not desirable in as much as to do so requires hardening of computing devices supporting the content services due to the physical environment of the base station. As such, when content services are performed at the base station, only a minimal computing device is provided to handle only the most basic content services. However, oftentimes it is desirable to perform more than just the most basic content services. For instance, in many instances it is desirable to perform charging services for the content services delivered to end users. To the extent that charging services require more than the most basic computational device, charging services along with the corresponding content services are provided together in the RAN as a matter of convenience.

BRIEF SUMMARY OF THE INVENTION

Embodiments of the present invention address deficiencies of the art in respect to content services in a RAN and provide a novel and non-obvious method, system and computer program product for content caching with remote filtering services in a RAN. In an embodiment of the invention, a method for content caching with remote filtering services in a RAN can include receiving a response to a request from an end user device wirelessly coupled to a base station of the RAN, marking the response as uncacheable, and routing the response to the base station over a data communications network. In one aspect of the embodiment, the response can be received in an RNC of the RAN. Of note, the process of marking the response as uncacheable can depend upon the evaluation of a policy with respect to the response. For example, the policy can specify content in a response to be uncacheable according to age, according to constituent components of the content or according to a source of the content, to name a few examples. Finally, in another aspect of the embodiment, marking the response as uncacheable, can include annotating a hypertext transfer protocol (HTTP) header of the response to indicate that the response is not to be cached in the base station.

In another embodiment of the invention, a RAN based data processing system can be configured for content caching with remote filtering services. The system can include a base station comprising an antenna, a receiver, a transmitter, a processor, a local cache, and a network interface to a data communications network. The system also can include an RNC coupled to the base station over the data communications network and a caching module disposed in the base station and coupled to a cache. Finally, the system can include a filtering service executing in the RNC. The service can include program code enabled to receive a data request from the base station on behalf of an end user device, to route the request to a content server in a computer communications network through a coupled CN, to receive a response to the request, to determine whether or not the response is cacheable according to a policy, to mark the response as uncacheable if determined to be uncacheable, and to forward the response to the base station.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for a method, system and computer program product for content caching with remote filtering services in a RAN. In accordance with an embodiment of the invention, content requests received in an RNC from different base stations coupled to the RNC can be routed through a CN to addressed content providers in a content distribution network such as the global Internet. Response received for the requests can be compared to a filtering policy to determine whether or not the individual responses are cacheable. In this regard, the filtering policy can specify content uncacheable according to age of the content, type of the content, the source of the content, or constituent components of the content. For each response deemed not to be cacheable, the non-cacheable response can be marked as such and forwarded to a base station from which a corresponding request had been received. A caching module in the base station, in turn, can cache only those responses not marked uncacheable. In this way, the caching function can remain distributed in the respective base stations while maintaining the filtering service in the RNC.

Figure 1:
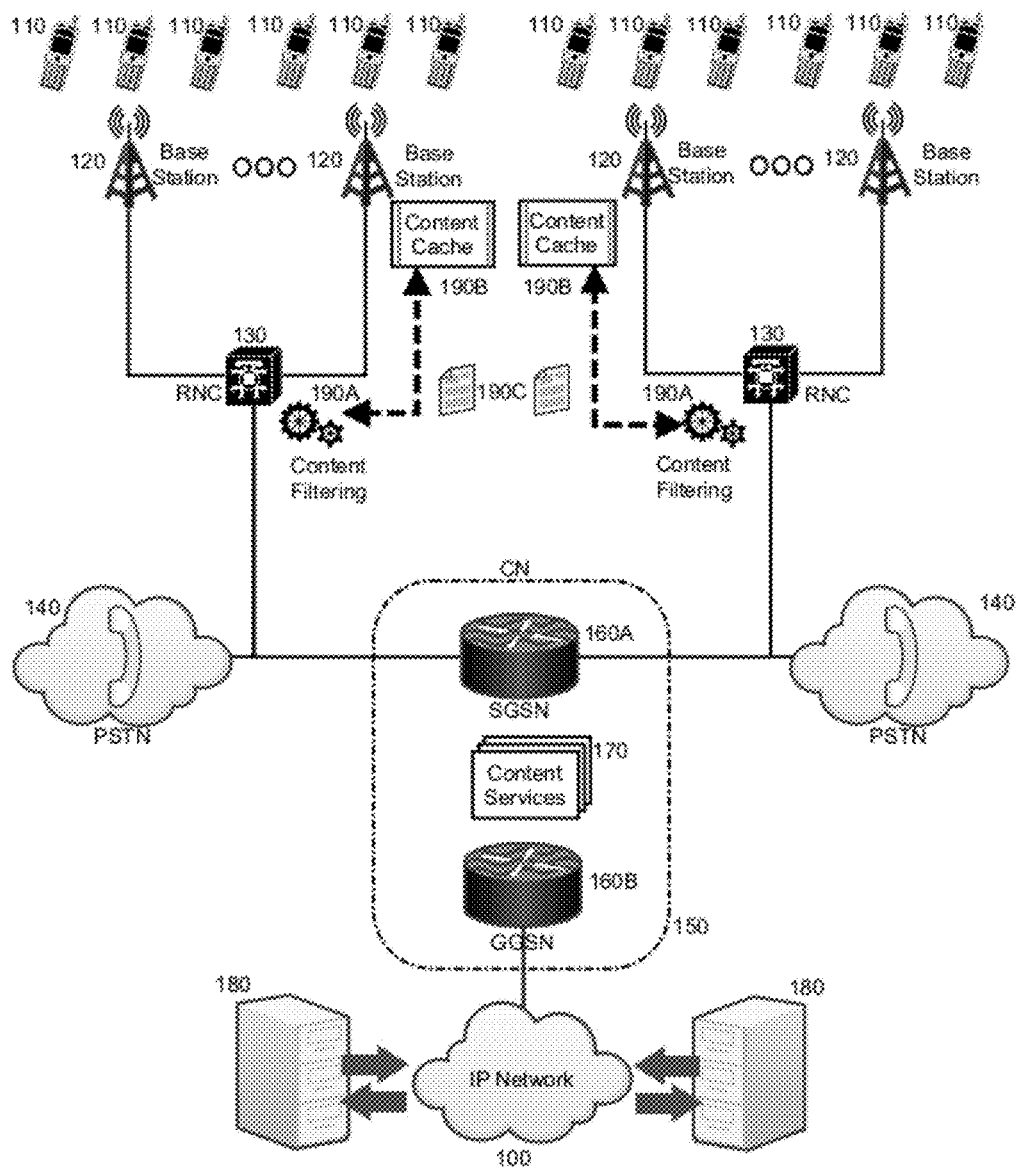
FIG. 1 is a pictorial illustration of a process for content caching with remote filtering services in a RAN.

In further illustration, FIG. 1 pictorially depicts a process for content caching with remote filtering services in a RAN. As shown in FIG. 1, a cellular telecommunications network can be provided to include different base stations 120 arranged to provide wireless telephonic access to different end user devices 110 for the PSTN 140. Clusters of the base stations 120 can be communicatively linked to a common RNC 130 that in turn can be coupled to a CN 150 thus forming a RAN. The CN 150 can include both a SGSN 160A acting as a gateway for traffic between the CN 150, the PSTN 140 and each RNC 130, and also a GGSN 160B acting as a gateway between the CN 150 and the data communications network 100—typically the global Internet. The CN 150 itself can support a number of content services 170 as is well known in the art.

Of note, a data processing system for content filtering 190A can be disposed in the RNC 130 and can be configured for communicative coupling to different content caches 190B each executing in respectively different base stations 120. The data processing system 190A can include program code that when executes in the data processing system, processes content 190C retrieved in response to a content request originating from an end user device 110 by way of a corresponding base station 120, from a content server 180 on the data communications network 100 by way of the CN 150. Specifically, the data processing system 190A can filter the content 190C according to a filtering policy specifying whether or not particular content 190C is to be deemed cacheable. For content 190C deemed uncacheable, the data processing system 190A can mark the content 190C as such, for example by embedding a notation in an HTTP header of the content 190C. Thereafter, the data processing system 190A can route the content 190C to the corresponding base station 120 for return to the end user device 110 and for caching by the content cache 190B if the content 190C has not be marked as uncacheable.

Figure 2:
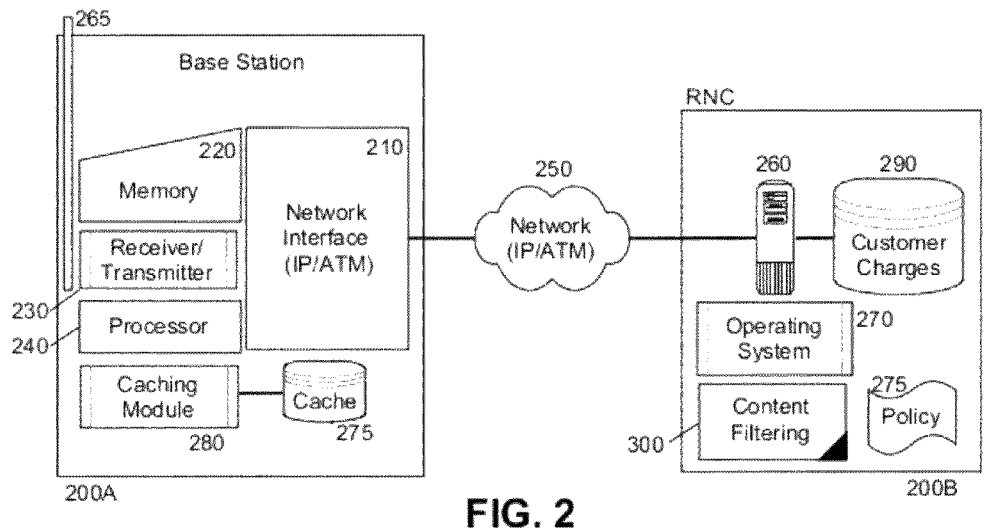
FIG. 2 is a schematic illustration of a RAN based data processing system configured for content caching with remote filtering services; and, FIG. 3 is a flow chart illustrating a process for content caching with remote filtering services in a RAN.

In yet further illustration, FIG. 2 is a schematic illustration of a RAN based data processing system configured for content caching with remote filtering in a packet data network such as a 2.5G or 3G network. The system can include a base station 200A coupled to an RNC 200B over a communications network 250, commonly an IP network or an asynchronous transfer mode (ATM) network. The base station 200A can include a receiver/transmitter 230 receiving over-the-air communications from different end user devices within transmission range of the base station 200A by way of antenna 265, and routing the same to the RNC 200B by way of a network interface 210. A processor 240 can be provided to perform computational processing on received data as the data is placed in memory 220. A caching module 280 coupled to a content cache 275 can execute by the processor 240 of the base station 200A. The caching module 280 can perform caching of cacheable content in the cache 275 for content received in the base station 200A in response to requests from coupled end user devices.

The RNC 200B, in turn, can include a host computer 260 with at least one processor and memory supporting the execution of an operating system 270. The operating system 270 in turn can host the execution of a content filtering service 280. The content filtering service 280 can include program code that when executed in the operating system 270, can receive responses to requests from over the data communications network 250 and apply a policy 285 to those responses to determine whether or not the responses are cacheable. For responses determined not to be cacheable, the program code of the content filtering service 280 can mark those uncacheable responses as such—for example by annotating a header to the responses indicating that the responses are not be cached by the caching module 280 in the base station 200A.

Figure 3:
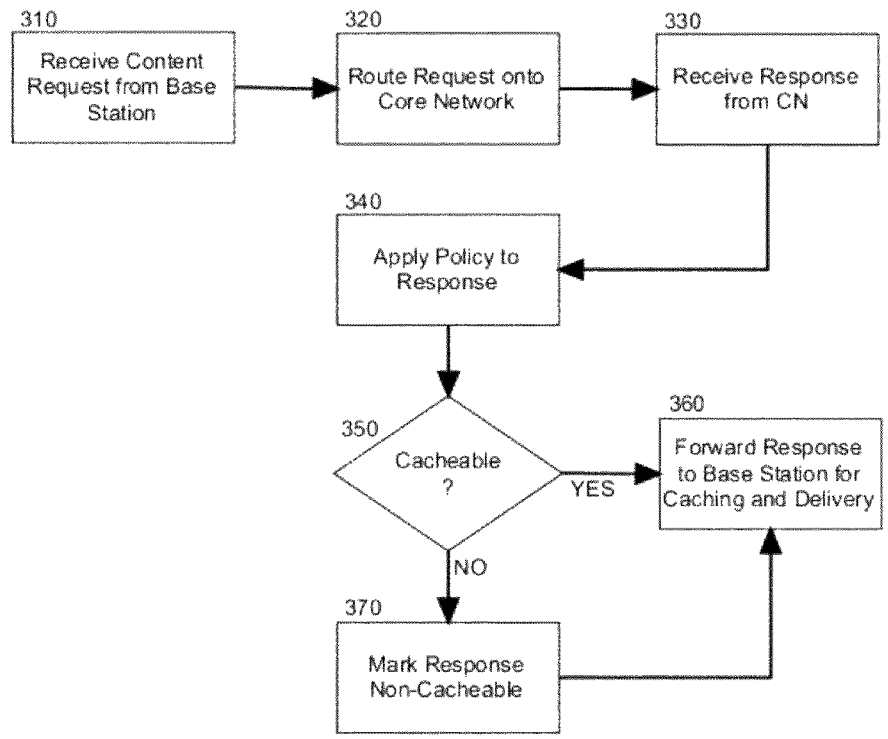

In even yet further illustration, FIG. 3 is a flow chart illustrating a process for content caching with remote filtering services in a RAN. Beginning in block 310, a content request can be received from a base station on behalf of an end user device wirelessly accessing the base station. In block 320, the request can be routed onto the CN for ultimate processing by a content provider on the global Internet. In block 330, a response to the request can be received from over the CN and in block 340, a policy can be applied to the response. The policy can specify whether or not content in the response is to be cached or marked uncacheable. For instance, the policy can set forth that content is not be cached based upon the age of the content, the constituency of the content, or the source of the content, to name only a few criteria.

In decision block 350, if the policy once applied results in the content having been determined to be cacheable, the response can be routed to the base station for delivery to the end user device and caching in the base station at the discretion of the caching module of the base station. However, if in decision block 350, it is determined according to the policy that the content is not cacheable, in block 370, the response can be marked as non-cacheable before the content is returned in the response to the base station in block 360 along with the marking of non-cacheability.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A radio access network (RAN) based data processing system configured for content caching with remote filtering services, the system comprising:
   a cluster of base stations each comprising an antenna, a receiver, a transmitter, a processor, a local cache, and a network interface to a data communications network;
   a radio network controller (RNC) coupled to each of the base stations in the cluster over the data communications network, the RNC additionally being coupled by way of a public switched telephone network (PSTN) to a core network (CN) comprising both a serving generalized radio packet service node (SGSN) acting as a proxy gateway for traffic between the CN and the PSTN and the RNC, and also a gateway generalized packet radio service (GPRS) service node (GGSN), the RNC, base stations and CN with SGSN and GGSN forming a RAN;
   a caching module disposed in each of the base stations and coupled to a corresponding cache; and,
   a filtering service executing in the RNC, the service comprising program code enabled to receive a data request from one of the base stations on behalf of an end user device, to route the request to a content server in a computer communications network through the CN, to receive a response to the request in the filtering service of the RNC, to determine in the filtering service in the RNC whether or not the response to the request is cacheable according to a policy, to annotate a header of the response as uncacheable indicating that the response is not to be cached by the caching module in the one of the base stations of the RAN if the response to the request is determined to be uncacheable, and to forward the response to the one of the base stations, the caching module of the one of the base stations caching the response in the corresponding cache only if the header of the request is not annotated so as to indicate that the response is uncacheable.

2. The system of claim 1, wherein the policy specifies content in a response to be uncacheable according to age.

3. The system of claim 1, wherein the policy specifies content in a response to be uncacheable according to constituent components of the content.

4. The system of claim 1, wherein the policy specifies content in a response to be uncacheable according to a source of the content.

5. A computer program product for content caching with remote filtering services in a radio access network (RAN), the computer program product comprising:
   a non-transitory computer readable storage medium having computer readable program code embodied therewith, the computer readable program code comprising:
   computer readable program code for receiving in a radio network controller (RNC) of the RAN and coupled to a base station of the RAN, a response to a request from an end user device wirelessly coupled to the base station of the RAN;
   computer readable program code for determining in the RNC whether or not the response to the request is cacheable according to a policy;
   computer readable program code for annotating a header of the response as uncacheable indicating that the response is not to be cached in the base station if the response to the request is determined to be uncacheable; and,
   computer readable program code for routing the response to the base station over a data communications network the base station caching the response in a corresponding cache only if the header of the request is not annotated so as to indicate that the response is uncacheable.

6. The computer program product of claim 5, wherein the policy specifies content in a response to be uncacheable according to age.

7. The computer program product of claim 5, wherein the policy specifies content in a response to be uncacheable according to constituent components of the content.

8. The computer program product of claim 5, wherein the policy specifies content in a response to be uncacheable according to a source of the content.

* * * * *